United States Patent

[11] 3,602,243

[72] Inventors Ray G. Holt
 Westlake;
 Austin E. Pettyjohn, Parma; Donald A.
 Stremple, Strongsville, all of, Ohio
[21] Appl. No. 839,222
[22] Filed July 7, 1969
[45] Patented Aug. 31, 1971
[73] Assignee Eaton Yale & Towne Inc.
 Cleveland, Ohio

[54] PRESSURE COMPENSATED MULTIFUNCTION CONTROL VALVE
 4 Claims, 5 Drawing Figs.
[52] U.S. Cl. .................................................... 137/115,
 91/413, 91/446, 137/596.12, 137/625.68
[51] Int. Cl. .......................................................F15b 11/16,
 F16k 11/18
[50] Field of Search .......................................... 91/413,
 446; 137/108, 115, 116, 117, 596.12, 596.13,
 625.17, 625.68, 625.69, 636.4

[56] References Cited
 UNITED STATES PATENTS
Re. 26,338  1/1968  Allen ........................... 137/117
2,655,167  10/1953  Dunkelow .................. 137/636.4 X
2,700,985  2/1955  Gleasman .................... 137/636.4 X
2,755,624  7/1956  Klessig et al. ............... 137/115 X
2,905,190  9/1959  Oyster ......................... 137/115 X
3,015,344  1/1962  Hausmann et al. ......... 91/413 X
3,269,412  8/1966  Badke .......................... 137/625.17
3,411,416  11/1968  Herd et al. ................... 137/117 X
3,455,210  7/1969  Allen ............................ 137/117 X
3,469,606  9/1969  Getman ........................ 137/636.4

FOREIGN PATENTS
609,376  9/1960  Italy ............................. 137/625.17
1,052,250  3/1959  Germany ...................... 91/413

OTHER REFERENCES
German Printed Application 1052250 3-1959 Klockner 91 413 2 3

Primary Examiner—Laverne D. Geiger
Assistant Examiner—David J. Zobkiw
Attorney—Teagno & Toddy ABSTRACT: A flow control valve having a control member which is rotatable to select any several fluid motors to be operated and is shiftable axially to set the flow rate for the selected fluid motor. A single pressure-compensating valve regulates the flow rate through the flow control valve for any selected rotational and axial position of the control member.

INVENTORS
RAY G. HOLT,
AUSTIN E. PETTYJOHN,
& DONALD A. STREMPLE
BY
ELY, GOLRICK & FLYNN
ATTORNEYS

PRESSURE COMPENSATED MULTIFUNCTION CONTROL VALVE

This invention relates to a pressure-compensated flow control valve for selectively controlling the operation of any of several fluid motors.

Various types of industrial and agricultural equipment, such as lift trucks and tractors, use several cylinder-and-piston fluid motors to perform different work functions, usually at different speeds. Conventionally, these fluid motors are controlled by individual flow control valves, each having its own operating handle.

The present invention avoids the inconvenience and expense of such multivalve hydraulic controls by providing a single flow control valve for selectively controlling the operation of any of several fluid motors which the user may want to operate at any desired speed. Whichever fluid motor is selected for operation, the flow rate through the present multifunction flow control valve is regulated by a single pressure-compensating valve so as to maintain constant the speed at which the fluid motor is operated, in accordance with the manual setting of the flow control valve.

Accordingly, it is a principal object of the present invention to provide a novel and improved pressure-compensated flow control valve arrangement for selecting any of the several fluid motors to be operated and for determining the speed at which the selected motor will be operated, with a single pressure-compensating vale connected to regulate the flow rate in accordance with the setting of the control member for each of its several possible motor connections.

Further objects and advantages of this invention will be apparent from the following detailed description of a presently preferred embodiment, which is shown schematically in the accompanying drawings.

Figure 1:
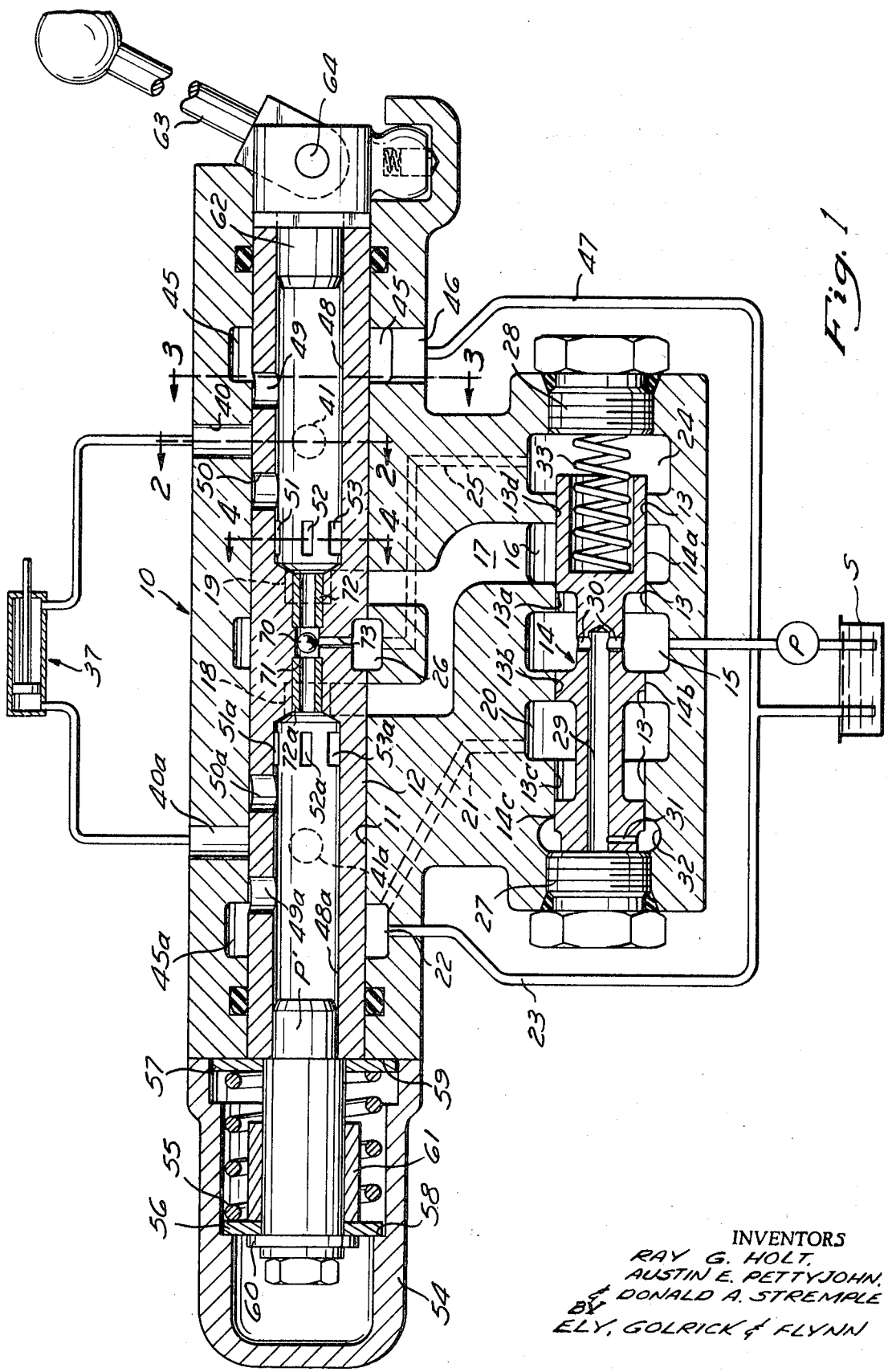
FIG. 1 is a schematic longitudinal sectional view of a valve arrangement in accordance with one embodiment of the present invention.

Referring to FIG. 1, in accordance with a preferred embodiment of the present invention a valve body or housing 10 has a main cylindrical bore 11 which snugly, but slidably, receives a control member 12 which is both rotatable and axially shiftable in the bore. The valve body 10 also has an auxiliary bore 13 extending parallel to its main bore 11 and slidably receiving pressure-compensating valve member 14.

Midway along its length the auxiliary bore 13 in the vale body communicates with an annular inlet port 15 connected to the outlet of a pump P. A short distance to the right of the inlet chamber 15 in FIG. 1, and separated from the latter by a cylindrical land 13a, the auxiliary bore 13 communicates with an annular controlled flow outlet pot 16 which is connected by a passage 17 to a pair of axially spaced inlet pots 18 and 19 leading into the main bore 11 in the valve body. A short distance to the left of the inlet chamber 15 in FIG. 1, and separated from the latter by a cylindrical land 13bthe auxiliary bore 13 in the valve body communicates with an annular bypass outlet port 20 that is connected by a bypass passage 21 to a return port 22 in the valve body. This return port 22 is connected directly to a return line 23 leading back to the sump S. A short distance to the right of the controlled flow outlet port 16, and separated from the latter by a cylindrical land 13d, the auxiliary bore 13 communicates with an enlarged reference chamber or pressure-sensing chamber 24 that is connected by a passage 25 to an annular chamber 26 intersecting the main bore 11 midway between the latter's inlet passages 18 and 19. The opposite ends of the intermediate bore 13 are closed by respective screw-threaded plugs 27 and 28.

The pressure-compensating valve member 14 is an elongated piston having a cylindrical land 14b for sealing engagement with the land 13b of auxiliary bore 13 and an elongated cylindrical land 14a of sealing engagement with the lands 13a and 13d of bore 13. The piston 14 has an internal longitudinal passage 29 which at its right end in FIG. 1 communicates with the inlet port 15 through radial openings 30. At its left end in FIG. 1, the passage 29 communicates through a radial passage 31 with an annular recess 32 that intersects bore 13 to the left of the bypass outlet port 20 and is separated from the latter by a cylindrical land 13c of the bore 13. Piston 14 presents a cylindrical land 14c which sealingly engages this bore land 13c A coil spring 33 is engaged under compression between the piston 14 and plug 28 to bias the piston to the left, as shown in FIG. 1 so that the left end of the piston engages the inner end of plug 27. In this position of the piston, its land 14b sealingly engages the bore land 13b, its land 14a sealingly engages the bore lands 13a and 13c, and its land 14c sealingly engages the bore lands 13aand 13c. Accordingly, the inlet port 15 is blocked by the piston 14 from controlled flow outlet port 16 leading to the inlet ports 18, 19 at the main bore 11 and from the bypass outlet port 20 leading to the return.

Figure 2:
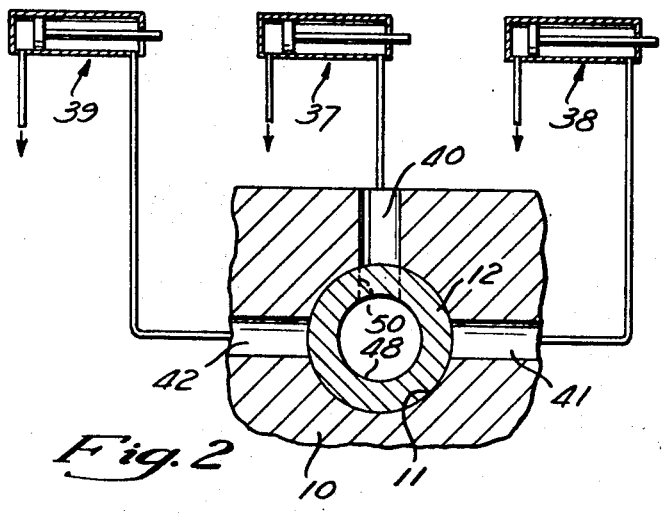
FIG. 2 is a fragmentary cross-sectional view taken along the line 2—2 in FIG. 1 and showing the various possible fluid motor inlet connections for the control member.

To the right of its inlet passage 19 in FIG. 1, the main bore 11 in the valve body communicates with a group of three circumferentially spaced motor ports which, in the particular embodiment illustrated, are located at the same axial position along bore 11. These three motor ports are shown at 40, 41, and 42 in FIG. 2. Only the middle port 40 appears in FIG. 1. The other two motor ports 41 and 42 are displaced circumferentially from port 40, on opposite sides of the latter. The three motor ports are connected individually to the rod ends of respective cylinder-and-piston fluid motors 37, 38 and 39, as shown schematically in FIG. 2.

To the right of the three motor ports 40, 41, 42 in FIG. 1, the main bore 11 is intersected around its complete circumferential extent by an annular passage 45 (FIG. 3) connected to a return port 46 which in turn is connected to a return line 47 leading back to the sump S.

Figure 3:
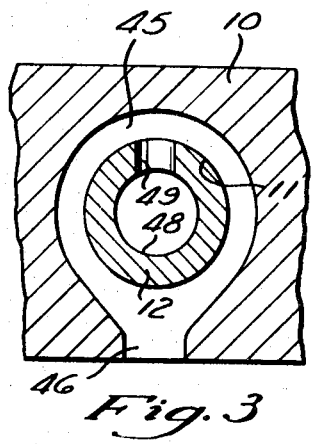
FIG. 3 is a similar view taken along the line 3—3 in FIG. 1 at one of the return passages of the flow control valve.

The right end of control member 12 has a longitudinal internal passage 48 intersected by a radial port 49 which, when control member 12 is displaced axially to the left in FIG. 1, may register selectively with any one of the motor ports 40, 41, or 42, depending upon the rotational setting of the control member. In the neutral or centered axial position of the control member, as shown in FIG. 1 its port 49 is blocked from all of the motor ports 40, 41, and 42, and it registers partially with the passage 45 leading to return, as shown in FIG. 3. When control member 12 is shifted axially to the right from the neutral position, its port 49 registers more fully with the return passage 45 in the valve body.

To the left of its port 49, the control member 12 has a similar radial port 50 intersecting the internal control member passage 48 at the same circumferential location on the control member as port 49. When the control member is displaced axially to the right from the neutral position shown in FIG. 1, its port 50 may register with any one of the motor ports 40, 41 or 42, depending upon the rotational position to which the control member is turned. The axial spacing between control member ports 50 and 49 is equal to the axial spacing between the group of motor ports 40, 41, 42 and the return passage 45 in the valve body, so that when the control member port 50 is positioned to register with one of the motor ports 40, 41 or 42 the control member port 49 will register fully with the return passage 45.

Figure 4:
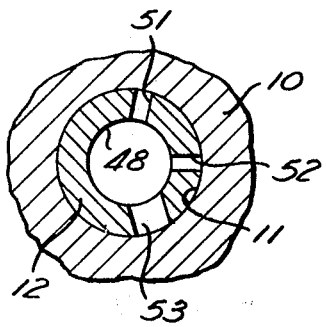
FIG. 4 is a similar view taken along the line 4—4 in FIG. 1 at one set of inlet ports in the control member.

To the left of its port 50 the control member has a group of three openings or ports 51, 52, 53 (FIG. 4) which in the particular embodiment illustrated, intersect the internal control member passage 48 at the same axial position along the control member and are spaced apart circumferentially at 70° intervals. These openings 51–53 all have an axial length equal to that of the inlet opening 19 leading into the bore 11, but they have different circumferential widths, with opening 53 being the same circumferential width as the inlet opening 19 and wider than openings 51 and 52, and with opening 51 being slightly wider than opening 52.

When the control member is displaced axially to the left from its neutral position one of the ports 51–53 may register with the inlet port 19, depending upon the rotational setting of the control member. The extent of such registration depends, of course, on the axial position of the control member, and it will be apparent that these ports 51–53 may meter or restrict the inlet flow in accordance with the circumferential width of the control member port 51, 52 or 53 which then registers with the inlet port 19 and the extent to which that control member port axially overlaps the inlet port 19.

The axial spacing between the group of three flow control ports 51–53 and the flow control port 49 is equal to the axial spacing between the valve body inlet port 19 and the group of valve body motor ports 40–42, so that when one of the flow control ports 51–53 axially overlaps the inlet port 19 then the flow control port 49 will axially overlap the corresponding motor port 40, 41 or 42 to the same extent.

To the left of its other inlet passage 18 in FIG. 1, the main bore 11 in the valve body is intersected by a second group of three circumferentially spaced motor ports, only one of which (40a) appears in FIG. 1. These three motor ports 40a, 41a and 42a are connected individually to the head ends of the respective cylinder-and-piston units 37, 38 and 39, as indicated schematically in FIG. 2. The three motor ports of this second group are at the same axial location along bore 11, and preferably they are identical to the corresponding motor ports 40, 41 and 42 of the first group.

The left end of the control member has a longitudinal internal passage 48a and ports 49a, 50a, 51a, 52a and 53a which correspond to the similarly numbered passage and ports in the right end of the control member. The previously mentioned return port 22 communicates with an arcuate return passage 45a in the valve body which intersects the main bore 11 in the same manner as the return passage 45. Ports 49a and 50a in the control member are adapted in different axial positions of the control member to register selectively with one of the motor ports 40a, 41a, 42a of the second group, depending upon the rotational setting of the control member. Control ports 51a, 52a and 53a are adapted to register selectively with the inlet port 18, depending upon the rotational setting of the control member, when the control member is displaced axially to the right in FIG. 1.

The axial spacing between control member port 49a and the group of control member ports 51a, 52a, 53a is equal to the axial spacing between the second group of motor ports 40a, etc., and the inlet port 18 in the valve body. The axial spacing between control member ports 50a and 49a is equal to the axial spacing between this second group of motor ports in the valve body and the return passage 45a.

When the control member is displaced axially to the right in FIG. 1, to connect one of its inlet ports 51a, 52a or 53a to the inlet port 18, then its port 49a will be positioned axially to register with one of the motor ports 40a, 41a or 42a in the second group, (depending upon the rotational setting of the control member), its port 50 will be positioned axially to register with the corresponding motor port 40, 41 or 42 of the first group, and its port 49 will register with the return passage 45.

Conversely, when the control member is displaced to the left in FIG. 1 to connect one of its inlet ports 51, 52 or 53 to the inlet port 19, then its port 49 will be positioned axially to register with one of the motor ports 40, 41 or 42 of the first group (depending upon the rotational setting of the control member), its port 50a will be positioned axially to register with the corresponding motor port of the second group, and its port 49a will register with the return passage 45a.

The left end of the control member passage 48a is closed by a plug P extending into an end cap 54 attached to the valve body 10. Within this end cap a coil spring 55 is engaged under compression between a pair of annular washers 56 and 57, which are slidably mounted on the outside of the plug P. Normally, spring 55 positions the washer 56 abutting against an internal annular shoulder 58 on the end cap and a collar 60 on plug P, and it also positions washer 57 abutting against an annular shoulder 59 on the end of valve body 10 and abutting against the left end of the control member 12. A sleeve 61 is attached to washer 56 and it extends toward washer 51 to limit the approach of either washer toward the other.

When the control member is displaced axially to the left from the centered neutral position shown in FIG. 1, the left end of the control member forces washer 57 to the left, further compressing the centering spring 55. Such axial displacement of the control member to the left is limited by the engagement of washer 57 against the end of sleeve 61.

Conversely, when the control member is displaced axially to the right from the FIG. 1 position, the collar 60 on the end plug P' attached to the control member forces washer 56 to the right, further compressing the centering spring 55. Such axial displacement of the control member to the right is limited by the engagement of sleeve 61 against washer 57.

At the right end of the control member 12 its internal passage 48 is closed by a plug 62 having a press fit with the control member. A control handle 63 is pivotally connected at 64 to the control member and is mounted for pivotal movement of its free end toward and away from the valve body (for shifting the control member axially) and for rotational movement about the axis of the control member (for rotating the control member 12 within the bore 11). Suitable spring-pressed detents (not shown) may be provided for releasably locking the control member in each of its three rotational positions which provide registration with the motor ports connected to a selected cylinder-and-piston fluid motor, as described.

A ball shuttle valve is connected between the two internal passages 48 and 48a in the control member and the valve body passage 26 which is connected to reference pressure chamber 24 at one end of the pressure-compensating valve piston 14.

As shown in FIG. 1, the ball valve 70 is loosely disposed in a cylindrical recess 71 in the valve body positioned midway between the inner ends of the respective internal passages 48 and 48a in the valve body and connected to the latter by respective sleeves 72 and 72a. A radial passage 73 connects this recess 71 to the valve body passage 26. The diameter of the ball valve 70 is less than the axial spacing between the inner ends of sleeves 72 and 72a, so that when the ball valve sealingly engages one of these sleeves the other sleeve is in fluid communication with the radial passage 73.

OPERATION

When the control member 12 is in its neutral position, and assuming that the pump is not running, the pressure-compensating valve piston 14 will be positioned by spring 33 as shown in FIG. 1, blocking the pump output from the inlet passage 17 for the flow control valve. At this time the reference pressure chamber 24 behind the pressure-compensating valve piston 14 is connected to the low pressure return 23 by way of the valve body passages 25, 26 and past the ball shuttle valve 70 to the internal passages 48, 48a in the flow control valve, and the partially overlapping ports 49, 45 and 49a, 45a. Under these circumstances, chamber 24 will have substantially zero hydraulic pressure therein.

Chamber 24 is at sump pressure when, and only when, valve 12 is in its neutral position. At this condition if pump p is permitted to run, pressure will build in chamber 32 which is fed through passage 29 until piston 14 is displaced sufficiently to place chambers 15 and 20 in fluid communication, thus allowing output pressure to communicate with line 21.

When chamber 24 is connected to an inlet flow passage (48 or 48a) the same action will prevail if the pressure differential between chamber 32 and chamber 24 is sufficiently large.

When the pump begins to run, its output pressure will move the pressure-compensating piston 14 to the right in FIG. 1 far enough to connect the inlet port 15 to the controlled flow output port 16, but not far enough to completely unseat its land 14b from the valve body land 13b.

When the control member 11 is displaced axially from its neutral position to connect either inlet passage 18 or 19 to one end of the selected cylinder-and-piston fluid motor 37, 38 or 39 (depending upon the rotational setting of the control member) and to connect the other end of the selected fluid motor to return, the reference pressure chamber 24 behind the pressure-compensating valve 14 will be connected to the internal flow control valve passage 48 or 48a which is passing the inlet flow to the selected fluid motor. This inlet flow passage will be at a slightly higher pressure than the other internal flow control valve passage 48a or 48 which is conducting the return flow from the motor. The ball shuttle valve 70 will respond to this pressure differential and will move over to seat against the sleeve 72 or 72a at the inner end of the respective internal flow control valve passage 48 or 48a which is then connected to the return motor passage, thereby connecting the inlet flow passage to chamber 24 of the pressure-compensating valve.

The pressure-compensating piston 14 senses the pressure differential between the pump output pressure (which is now essentially the same as the pressure at passage 17 leading into the flow control valve) and the pressure at the passage 48 or 48a which is conducting the inlet flow to the selected cylinder-and-piston unit. That is, the pressure-compensating piston senses the pressure drop across the variable orifice at the inlet port 19 or 18 which is conducting the inlet flow. The size of this inlet flow orifice is determined by the selection of the flow control valve opening 51, 52, 53 or 51a, 52a, 53a which then registers with this inlet port and the axial position of the flow control valve, which determines the amount of axial overlap between this flow control valve port and the inlet port. It maintains this pressure differential constant, thereby maintaining constant the inlet flow rate to the selected cylinder-and-piston, by bypassing excess flow from its inlet chamber 15 past the land 14b on the pressure-compensating piston 14 to the low pressure return passage 20. Thus, for any given setting of the control member 11, if the inlet flow rate through the flow control valve tends to increase, the pressure-compensating piston 14 will move farther to the right in FIG. 1 and will thereby increase the bypass flow to return so as to eliminate the tendency for the flow control valve inlet flow rate to increase. The reverse action takes place if the inlet flow rate through the flow control valve tends to decrease below the rate called for by the axial setting of the control member 11.

If the amount of this bypass flow is not sufficient to reduce the inlet flow through the flow control valve in accordance with the latter's setting, the continued movement of piston 14 to the right will cause its land 14b to progressively restrict the fluid flow from the inlet port 15 to the controlled flow outlet port 16, thereby providing a series flow restriction ahead of the flow control valve inlet in addition to providing a bypass passage to the bypass outlet port 20.

With this arrangement the pressure-compensating valve 14 regulates the inlet flow rate to the selected cylinder-and-piston fluid motor in accordance with the size of the inlet flow orifice provided by the control member. Changes in the pump pressure or in the load on the selected fluid motor will be compensated for by the action of the pressure-compensating valve in maintaining constant the pressure differential across this inlet flow orifice.

Figure 5:
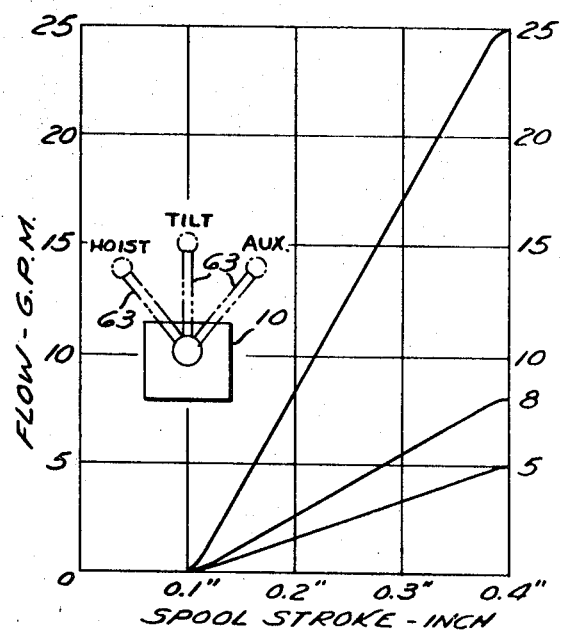
FIG. 5 is a graph showing the flow rate plotted against the control member position for different motor connections of the present flow control valve.

The present valve arrangement enables the user by a simple adjustment of the handle 63 to select any one of several fluid motors to be operated and to select the flow rate to the selected motor, which flow rate will then be regulated by the pressure-compensating valve. Only a single pressure-compensating valve is required to regulate the selected flow rates to the different fluid motors, even though these flow rates may, for a given axial setting of the control member, be quite different for the different fluid motors. For example, as shown in FIG. 5, the flow rate for the "hoist" fluid motor 39, which is selected by turning the control member to provide registration of its port 53 with the inlet port 19 or registration of its port 53a with the inlet port 18, may be substantially greater for a given axial displacement of the control member from its neutral position, than the flow rate for the "auxiliary" fluid motor 38 or the "tilt" fluid motor 37.

Plug 28 may be adjusted to selectively vary the force exerted by spring 33, to thereby determine the flow rate for a given rotational and axial setting of the control member 12.

MODIFICATIONS

If desired, the control member porting may be modified to enable the connection of two fluid motors to the pump in a particular rotational setting of the control member, so that both these motors may be operated simultaneously, with the inlet flows to both motors being regulated by the pressure-compensating piston 14 in the manner already described in detail.

Also, if desired, the bypass passage 21 may be omitted and the bypass outlet port 20 of the pressure-compensating valve may be connected to a high pressure carryover passage, which may lead to the inlet of another pressure-compensated directional valve in case several of these valves are to be connected in series with each other for operation from a single pump. Such an alternative arrangement is possible because the pressure-compensating valve 14 is capable of providing a series flow restriction ahead of the flow control valve inlet passage 17, as well as bypassing excess flow to the bypass passage 20, in case the bypass flow alone does not reduce sufficiently the inlet flow to passage 17.

The motor ports 40, 41, 42 and 40a, 41a, 42a need not be at the same axial location along the valve body 10, and the control member ports 51, 52, 53 and 51a, 52a, 53a need not be at the same axial position. By appropriate design changes, the directional valve may be modified so that the selection of the fluid motor or motors to be operated is determined by the axial setting of the control member 12 and the flow rate is determined by the rotational setting of the control member.

Another possible modification is to connect the pressure-compensating valve 14 so that it senses the return flow from the fluid motor being operated and controls the inlet flow to the flow control valve in accordance with this return flow so that the fluid motor cannot "run away" by producing a return flow faster than its inlet flow, such as when the fluid motor is lowering a heavy load.

We claim:

1. A multifunction valve arrangement for selectively controlling the operation of at least one of a plurality of fluid operated devices comprising:

a source of pressurized fluid;

a flow control valve having a bore, an inlet port, an outlet port, a plurality of motor supply ports and a plurality of motor return ports corresponding in number to said motor supply ports intersecting said bore, said flow control valve having a control member rotatably and axially slidably mounted within said bore in a sealing relation thereto, said control member being rotatable to selectively connect said inlet port to a selected motor supply port and said outlet port to a corresponding motor return port and being axially slidable to control the extent of flow between said inlet port and said selected motor supply port by providing an infinitely variable flow restriction orifice therebetween; and a pressure compensating valve arranged in series relationship between said source of pressurized fluid and said inlet port to regulate the flow of fluid to said inlet port in accordance with the rotational and axial setting of said control member, said pressure compensating valve comprising:

a cylinder;

an axially spaced inlet chamber connected to said source of pressurized fluid, an outlet chamber connected to said inlet port, a bypass chamber and pressure-sensing chamber connected to said selected motor supply port intersecting said cylinder; and a valve piston slidably mounted within said cylinder, said valve piston sealingly engaging said cylinder and being biased in one direction by fluid pressure in said inlet chamber and biased in the other direction by fluid pressure in said pressure-sensing chamber and by a spring, said spring biasing said piston into a position whereat said piston blocks fluid communication between said inlet chamber, outlet chamber and bypass chamber.

2. A directional valve arrangement for selectively operating a plurality of fluid motors comprising:

a flow control valve having a valve body providing a bore for receiving a control member, said valve body having first and second inlet ports communicating with said bore, first and second groups of circumferentially spaced motor ports communicating with said bore at respective locations spaced axially from the inlet ports, and first and second return passages communicating with said bore at locations spaced axially from the respective inlet ports and the respective groups of motor ports;

and a control member sealingly engaging said bore and rotatable and slidable longitudinally therein;

said control member having first and second axially spaced internal longitudinal passages therein, said control member having a first pair of axially spaced flow ports communicating with the first internal passage and registrable selectively with a selected motor port of the first group in the valve body, depending upon the longitudinal and rotational setting of the control member, one of said flow ports in the control member registering with the first return passage when the other of said flow ports registers with a motor port of the first group, said control member having a first group of circumferentially spaced inlet ports communicating with said first internal passage and registrable selectively with said first inlet port in the valve body, depending upon the longitudinal and rotational setting of the control member, the longitudinal spacing between said first group of inlet ports in the control member and said one flow port in the control member corresponding to the longitudinal spacing between said first group of motor ports in the valve body and said first inlet port in the valve body, said control member having a second pair of axially spaced flow ports communicating with said second internal passage and registrable selectively with a selected motor port of the second group in the valve body, depending upon the longitudinal and rotational setting of the control member, one flow port of said second pair in the control member registering with said second return passage in the valve body when the other flow port of said second pair in the control member registers with a motor port of the second group, said control member having a second group of circumferentially spaced inlet ports communicating with said second internal passage and registrable selectively with said second inlet port in the valve body, depending upon the longitudinal and rotational setting of the control member, the longitudinal spacing between said second group of inlet ports in the control member and said one flow port of the second pair in the control member corresponding to the longitudinal spacing between said second group of motor ports in the valve body and said second inlet port in the valve body;

said control member, when one of the inlet ports of its first group thereof registers with said first inlet port in the valve body, passing inlet flow through its first internal passage to the selected fluid motor and passing return flow from said motor through its second internal passage to said second return passage;

said control member, when one of the inlet ports of its second group thereof registers with said second inlet port in the valve body, passing inlet flow through its second internal passage to the selected motor and passing return flow from said motor through its first internal passage to said first return passage;

pressure-compensating valve means connected upstream of said inlet ports in the valve body and operable to regulate the inlet flow thereto;

and valve means connected between said internal passages in the control member and said pressure-compensating valve means and operable to cause the pressure-compensating valve means to operate in response to the inlet flow to the selected motor.

3. A valve arrangement according to claim 2, wherein said pressure-compensating valve means has an inlet port, a bypass outlet port, and a controlled flow outlet port connected in series between the inlet port of the pressure-compensating valve means and said inlet ports in the valve body of the flow control valve, a piston slidably disposed between said inlet and outlet ports of the pressure-compensating valve means and controlling the flow from said last-mentioned inlet port to both of said outlet ports, spring means biasing said piston to a position blocking said inlet port from both said controlled flow outlet port and said bypass outlet port, and said piston having oppositely facing surfaces thereon which are exposed respectively to the hydraulic fluid pressures at said inlet port of the pressure-compensating valve means and at the internal control member passage which is conducting the inlet flow to the selected fluid motor and being positioned in accordance with the differential between said pressures to control the division of hydraulic fluid flow between said inlet and outlet ports of the pressure-compensating valve means.

4. A valve arrangement according to claim 3, wherein said piston is movable in response to an increasing differential between said pressures:

first, to progressively open said bypass outlet port to said inlet port of the pressure-compensating valve means;

and thereafter, to progressively close said controlled flow outlet port.